United States Patent Office 3,550,429
Patented Dec. 29, 1970

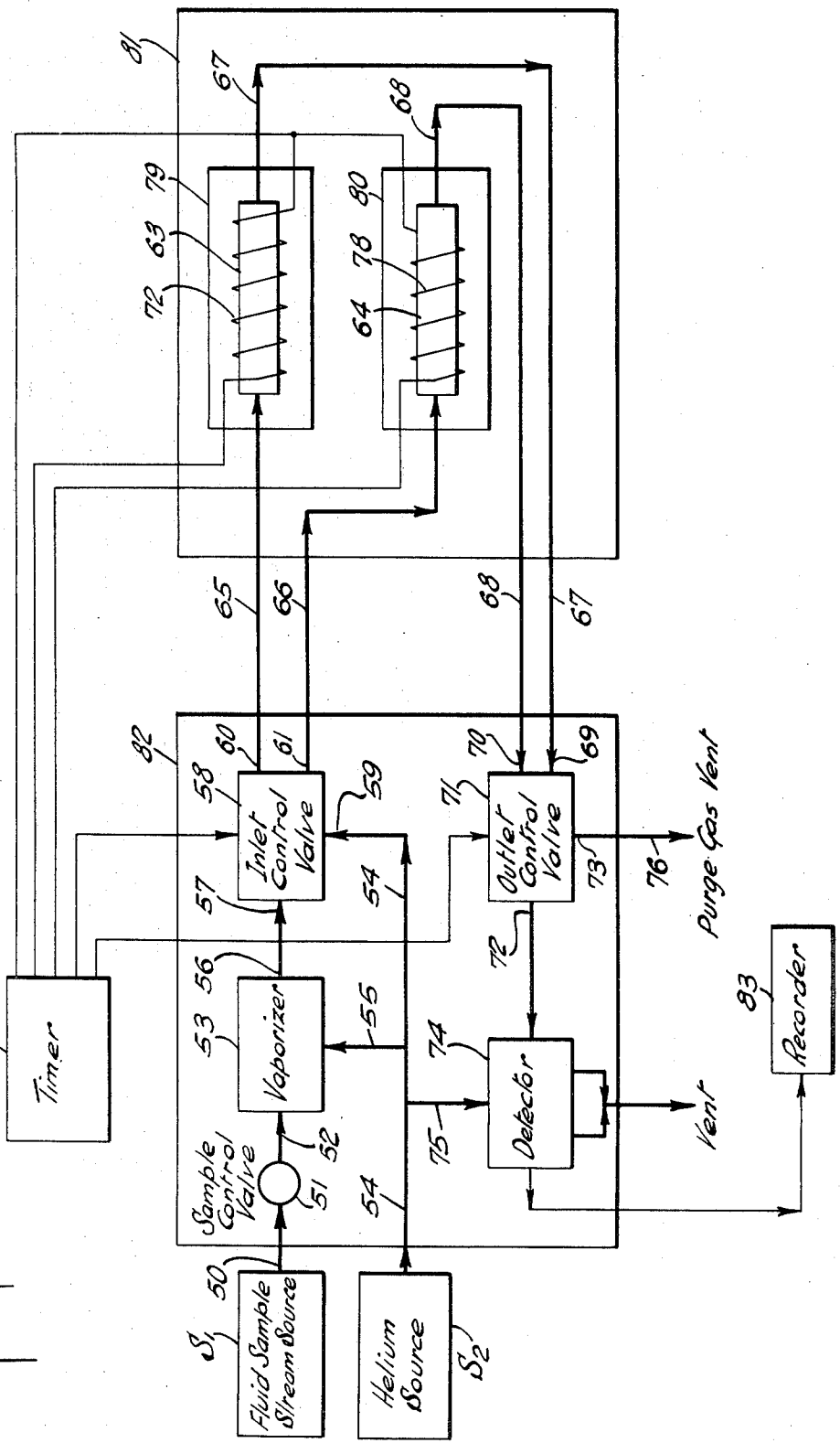

3,550,429
CHROMATOGRAPHIC ANALYSIS
Edward D. MacMurtrie and Wesley V. Taylor, Jr., Port Arthur, Tex., assignors to Texaco Inc., New York, N.Y., a corporation of Delaware
Filed Nov. 16, 1967, Ser. No. 683,497
Int. Cl. G01n 31/08
U.S. Cl. 73—23.1                     5 Claims

ABSTRACT OF THE DISCLOSURE

A method and apparatus for continuously monitoring a component of a fluid mixture, such as the non-normal content of a paraffin mixture, employing a plurality of chromatograph columns, preferably a pair thereof, of sorbent material which initially passes primarily only one component of the fluid, and which is readily desorbed of the sorbed components by heating or purging. A thermal conductivity detector is employed to monitor the effluent of the columns to detect the fluid component of interest. The fluid mixture is injected into one column either continuously or intermittently while the other columns are desorbed. The fluid flow to each column is automatically interrupted prior to breakthrough of the sorbed fluid component and desorption instituted while the fluid flow is switched to a desorbed column, thereby providing substantially continuous detection of the fluid component of interest free of interruptions for desorption steps. Short columns are used to minimize response time and configured to eliminate reverse flow purging.

BACKGROUND OF THE INVENTION

This invention relates to a method and apparatus for the analysis of fluid streams and more particularly to chromatographic analysis of hydrocarbon streams.

In laboratory and industrial applications it is frequently necessary to analyze a fluid stream to determine the concentration of its constituents. This is of particular importance in the petroleum refining industry where the control of many processes depends upon instantaneous information of the major and minor components of fluid streams undergoing process treatment. Indeed, the economy of a process is often predicated upon the extent to which a minor fluid component exists in the product, or the extent to which a more valuable component exists in an extract stream. In these applications, it is important to have continuous information of the components of the process streams or in the alternate to have periodic information at narrowly spaced time intervals so that corrections of process controls can be quickly made, and when possible automatically, before errors of the process become excessive thereby seriously affecting the economy of the process.

Elution chromatography as presently known has been of considerable application in this field. A major drawback of the conventional chromatographic technique arises from its basic nature as a discontinuous process. Normally in this technique a sample of the fluid to be tested is introduced into a column which contains a selective sorbent. A carrier or elution agent is simultaneously passed through the column to force a flow of the sample therethrough. Selected components of the sample are either adsorbed or delayed for various time intervals depending upon their affinity for the column material, and the fluid component of interest, generally the first to pass through the column, is detected by a physical property sensor as it appears at the effluent. A commonly used sensor is a thermal conductivity analyzer which detects the fluid components by measuring the thermal conductivity response of the column effluent. The thermal conductivity response will vary in a manner directly proportional to the concentration of the fluid components in the column effluent stream.

In this procedure, a column material may be used which separates through a process of sorption to remove certain fluid components from the sample stream thereby permitting certain other fluid component of interest to pass through and be detected. In this instance, it is necessary to inject samples of the fluid, at spaced time intervals so that the column will effectively separate the fluid component of interest for detection thereof as it appears at the effluent before the other fluid components. If the fluid samples are excessively large or too closely spaced, breakthrough of the sorbed fluid component to the column effluent will occur before elution and detection of the fluid component of interest is completed, resulting in inaccurate determination of the fluid component of interest. Therefore, a distinct time interval is required between samples and the size of samples must be sufficiently small. Furthermore, the operation of the column must be periodically interrupted and the sorbed fluid components desorbed from the column in order to maintain its ability to separate the fluid components. The time period between samples and the time period required for the desorption step constitute interruptions of analysis which are of objectionable duration in many process control applications.

In those instances where the chromatograph column material is a complete adsorbent of one or more of the fluid components passed therethrough, such as a zeolite molecular sieve used in analytical separation of straight molecular chain hydrocarbons from non-normal hydrocarbons, the non-normals are passed by the column and the straight chain component is completely adsorbed until the column is saturated, then the column will also permit straight chain components to pass. At this point the column must either be desorbed or repacked resulting in objectionable interruptions of analysis.

Various solutions to the problems of excessive time delay between samples and for desorption steps have been proposed. One such solution, disclosed in U.S. 3,069,897, Sanford, proposes the desorption step occurring between samples with the column operated at an equilibrium condition near saturation. The desorption step used is a reverse flow purge. A disadvantage of that solution is that it involves the use of a long two zone column to enable sufficient separation of the fluid components so that the reverse desorption purge eliminates only the fluid components which are slower to pass through the column without eliminating any of the fluid component of interest. A long column has the effect of increasing the residence time of the sample in the column, thereby increasing the time delay occurring between injection of the sample and its analysis at the column effluent. Furthermore, the desorption step is an interruption in the forward flow operation of the column of a substantial time duration contributing to the time lag between injection and detection of any one sample. In the reverse purge solution such time lags of greater than twenty minutes may be expected.

When the chromatographic device is used for process control purposes such time delays are considered excessive, particularly during periods of process upset. These periods may occur frequently and are often a consequence of variations in the composition of the process charge materials, and also occur following equipment start-up or when the process is switched from one product to another. During such periods of upset the compositions of process materials tend to vary relatively rapidly from the planned design point of optimum process performance. During such periods, in order to minimize process losses and to maintain optimum quality of the product, it is necessary to effect corrections of the process controls as expeditiously as possible in response to variations of the composition of process streams as they occur. Hence, for process control purposes, the use of a chromatographic analysis system in accordance with the present art, where generally excessive time lags between injection and analysis of the sample are encountered, is seriously disadvantageous.

The invention as herein disclosed provides a solution to the aforementioned problems by a unique and novel method employing the use of chromatograph apparatus in unique and novel combination, resulting in substantially continuous analysis suitable for process control applications.

SUMMARY

Briefly stated, a preferred aspect of the invention provides a method for continuously monitoring a component of a fluid mixture by a chromatographic procedure. The fluid mixture is first introduced into one of a plurality of chromatographic columns which permits passage of the fluid component to be detected, and selectively retards passage of the other fluid components. The effluent of the column is analyzed by a physical property sensor to detect the former fluid component and, prior to substantial breakthrough of the other components of the fluid mixture to the effluent of the column, the inlet flow of the fluid is switched to another column. The first column is regenerated by desorption over a time interval while substantially concurrently the fluid mixture is introduced to each of the other columns substantially singularly, and similarly discontinued prior to substantial breakthrough. The physical property sensor is similarly switched from a prior column experiencing flow of the fluid to a subsequent column, to enable substantially continuous analysis. The procedure is repeated with respect to each column and the cycle started again thereby obtaining substantially continuous detection of the fluid component of interest.

Another aspect of the invention provides apparatus in novel combination for practicing the method of the invention. The apparatus in part includes a plurality of chromatographic columns coupled to means for detecting the fluid component of interest and to a source of the fluid mixture through multiple path fluid diverter valves to enable the aforementioned switching sequences. Desorption means is also provided cyclically operable in unison with said valves for periodic desorption of each of the columns. The apparatus when operated through proper time sequences results in substantially continuous detection of the fluid component of interest uninterrupted for desorption steps and with a minimum time delay due to minimized residence time of the fluid in the apparatus.

In view of the foregoing it is an object of the invention to provide a simplified method for substantially continuous analysis of fluid streams.

Another object of the invention is to provide a method for continuous chromatographic analysis of fluid streams free of interruption for desorption steps.

Another object of the invention is to provide a method for chromatographic analysis of fluid streams of minimized response time, and enabling the use of short columns.

Another object of the invention is to provide a simplified method for chromatographic analysis of fluid streams of minimized response time free of the requirement of reverse purging for desorption.

Another object of the invention is to provide a simplified method for continuous chromatographic analysis of minimized response time, of the non-normal paraffin content of a paraffin mixture.

Another object of the invention is to provide embodiment of apparatus to fulfill the aforementioned objectives.

These and other objects, advantages and features of the invention will be more fully understood by referring to the following description and claims, taken in conjunction with the accompanying drawings.

BRIEF DESCRIPTION OF THE DRAWINGS

FIG. 4 is a schematic block diagram illustrating another embodiment of apparatus, for practicing the invention, adapted to monitor the non-normal paraffin content of a paraffin stream.

DESCRIPTION OF THE PREFERRED EMBODIMENTS

Figure 1:
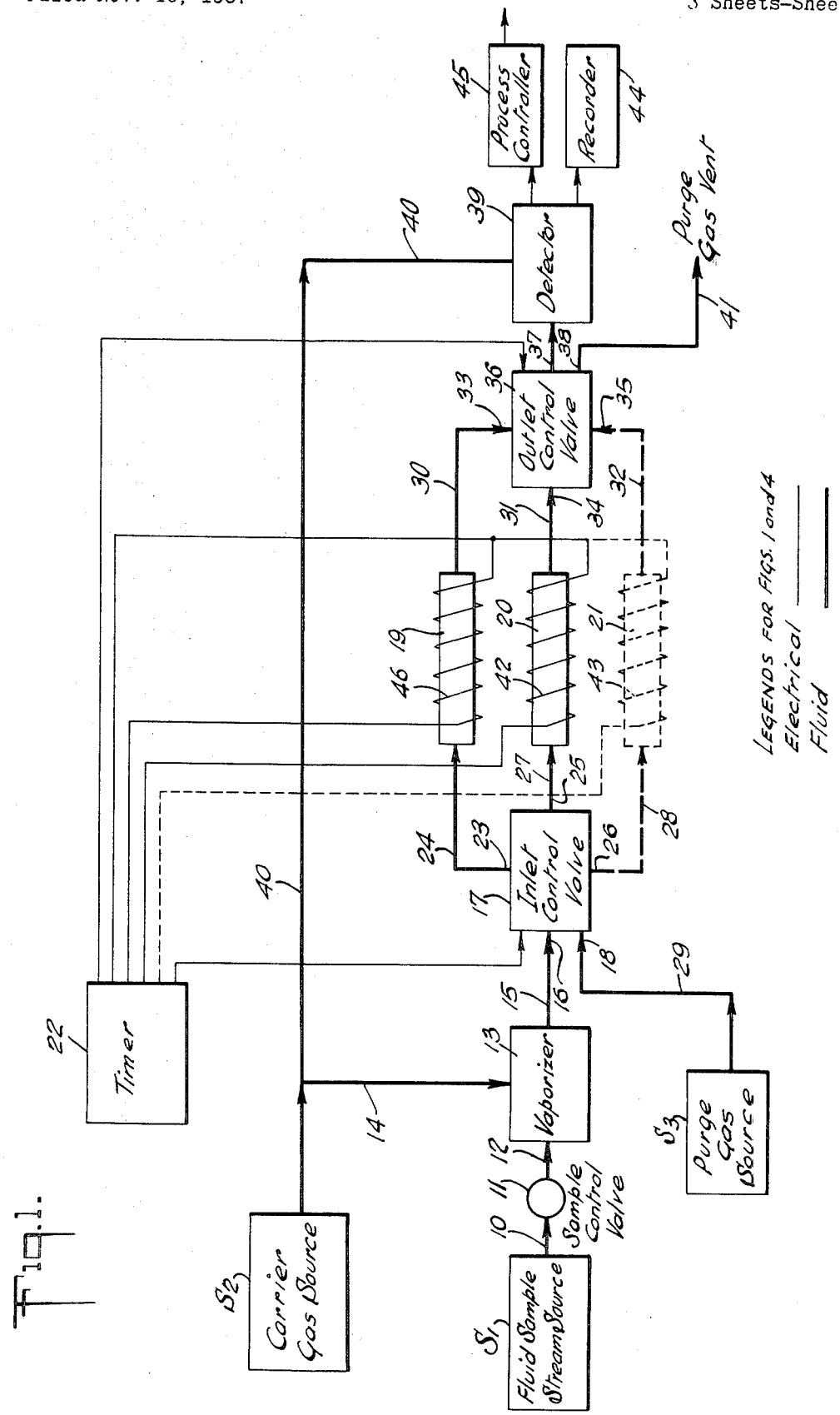
FIG. 1 is a schematic block diagram illustrating one embodiment of apparatus for practicing the invention.

Referring now to FIG. 1 a sample stream of the fluid being analyzed is introduced from a source $S_1$ through a conduit 10 connected to a flow control valve 11 which periodically measures and releases increments of predetermined amounts of the fluid. The size of the increments and the frequency at which they are released depend upon the particular fluid being analyzed and the material used in the chromatograph columns. A conduit 12 carries the fluid samples from the flow control valve 11 to a vaporizer 13. A suitable carrier gas from a source $S_2$ is introduced through a conduit 14 to the vaporizer 13 where the successive fluid samples are vaporized in the presence of the carrier gas and mixed therewith. The gaseous mixture flows from the outlet of the vaporizer 13 through a conduit 15 to an inlet port 16 of a solenoid-operated control valve 17. The valve 17 is an electrically-operated multiple path fluid diverter valve. Such valves are known in the art and generally consist of a rotatable central core containing a plurality of passages mounted within a fixed member, which also contains a plurality of inlet and outlet passages in communication with corresponding inlet and outlet ports therein. Rotation of the core to any one of various operative positions enables fluid communication between the inlet ports and certain of the outlet passages and discontinues fluid communication with other outlet passages by selective alignment of the passages in the core with the outlet passages in the fixed member. Remote operation of the valve may be achieved by electrical means utilizing for example, a rotary solenoid valve mechanically coupled to the rotatable core.

Figure 2:
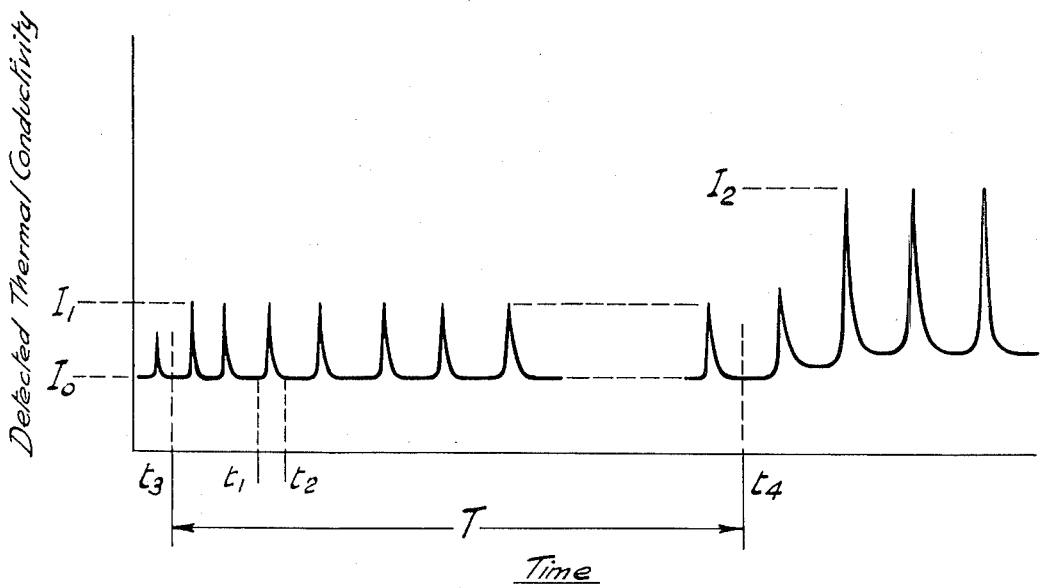
FIG. 2 is a graphical illustration of the detected thermal conductivity response of the effluent of a typical chromatograph column which may be used to practice the invention, plotted against time, when the column is subjected to a flow therethrough of repeated samples of distinct size of the fluid being analyzed.

The valve 17 has a first and a second inlet port 16 and 18, respectively. The number of outlet ports of the valve 17 and the corresponding fluid flow paths incorporated therein depend upon the number of chromatograph columns used in the system. In the embodiment of FIG. 2 two chromatograph columns 19 and 20, the minimum required for practicing the invention are shown. A third column 21 is shown by dotted lines to illustrate an optional configuration of the apparatus employing three or more columns. The criteria for the number of chromatograph columns used is discussed below in reference to FIGS. 2 and 3. Three outlet ports of valve 17 are shown, each chromatograph column having one such outlet port associated therewith.

The operative position of valve 17 is electrically controlled by a timer 22. When the valve 17 is in a first operative position its first inlet port 16 is in fluid communication with its first outlet port 23, which is in fluid communication with a chromatograph column 19 through a conduit 24. Also in its first operative position the valve 17 permits fluid communication between its second inlet port 18 and a second and a third outlet port 25 and 26, respectively, of the valve 17. The second and third outlet ports 25 and 26 are connected to conduits 27 and 28, respectively, which in turn are connected to the respective inlet ends of chromatograph columns 20 and 21. The second inlet port 18 of the valve 17 is connected to a conduit 29 which is connected to a source $S_3$ of a suitable purge gas. In its first operative position, therefore, valve 17 permits flow of the fluid sample to be analyzed from vaporizer 13 to the first chromatograph column 19 and concurrently permits flow of purge gas from conduit 29 to the second and third chromatograph columns, 20 and 21.

When the valve 17 is in a second operative position its first inlet port 16 is in fluid communication with its second outlet port 25 and its second inlet port 18 is in fluid communication with its first and third outlet ports 23 and 26, thereby permitting flow of fluid sample to the second chromatograph column 20 and concurrently permitting flow of purge gas to the first and third columns 19 and 21.

When the valve 17 is in a third operative position its first inlet port 16 is in fluid communication with its third outlet port 26 and its second inlet port 18 is in first communication with its first and second outlet ports 23 and 25, thereby permitting flow of fluid samples to the third chromatograph column 21 and currently permitting flow of purge gas to the first and second columns 19 and 20.

The chromatograph columns 19, 20 and 21 are packed with a selective sorbent material which permits passage of the fluid component to be detected and retards passage of other fluid components.

The outlet ends of columns 19, 20 and 21 are connected to conduits 30, 31 and 32, respectively, which in turn are connected to the inlet ports 33, 34 and 35, respectively, of a solenoid-operated control valve 36 which is similar in construction to the valve 17, and is similarly operated by the timer 22. Valve 36 has three inlet ports 33, 34 and 35 and two outlet ports 37 and 38. The first outlet port 37 is connected to a thermal conductivity detector 39 which detects the fluid component of interest by comparing the thermal conductivity response of the effluent of the chromatograph columns with the thermal conductivity response of the carrier gas which is introduced to the detector 39 through a conduit 40 from the source $S_2$. The second outlet port 38 of the valve 36 is connected to a vent conduit 41 for venting of the purge gas passed through the columns.

When the valve 36 is in a first operative position its first inlet port 33 is in fluid communication with its first outlet port 37, and its second and third inlet ports 34 and 35 are in fluid communication with its second outlet port 38, thereby permitting flow of the effluent of the first column 19 to the detector 39 and concurrently permitting venting of the effluent of the second and third columns 20 and 21.

When the valve 36 is in a second operative position its second inlet port 34 is in fluid communication with its first outlet port 37 and its first and third inlet ports 33 and 35 are in fluid communication with its second outlet port 38, thereby permitting flow of the effluent of the second column 20 to the detector 39 and concurrently permitting venting of the effluent of the first and third columns 19 and 21.

When the valve 36 is in a third operative position its third inlet port 35 is in fluid communication with its first outlet port 37 and its first and second inlet ports are in fluid communication with its second outlet port 38, thereby permitting flow of the effluent of the third column 21 to the detector 39 and concurrently permitting venting of the effluent of the first and second columns 19 and 20. It should be noted that the valves 17 and 36 may be replaced by a plurality of single path solenoid valves operated in a pre-programmed time sequence to perform the foregoing functions, and if a plurality of greater than three columns is used additional valves similar to 17 and 36 may be interposed in series with the present valves or in the alternate a plurality of single path valves may be used. One advantage of using single path valves is that the aforementioned operation of switching the flows of sample fluid and purge gas need not occur simultaneously and may be somewhat time-displaced to cause periods either of overlap of flow or of discontinuity of flow.

The timer 22 is pre-programmed to control the switching sequence of valves 17 and 36 so that when the valve 17 is in its first operative position, thereby passing samples of the fluid to be analyzed to the first column 19, the valve 36 is also in its first operative position so that the effluent of the first column 19 will be passed to the detector 39 for analysis thereby. The flow of sample increments is permitted to pass through the first column for a predetermined time interval, defined as that interval during which the column will pass the fluid component of interest to be analyzed and adsorb the other fluid components prior to substantial breakthrough of the latter components. Prior to substantial breakthrough timer 22 switches the flow of the fluid sample and the detector to the second column 20 by actuating valves 17 and 36 to their second operative positions. Also during the time interval of sample flow through the first column 19 the second and third columns 20 and 21 are subjected to a flow of purge gas to regenerate these columns by desorbing the fluid components adsorbed therein during earlier periods of sample flow therethrough. To accelerate the desorption, columns 20 and 21 are heated during purging by heating coils 42 and 43, respectively, which are also controlled by timer 22. A heating coil 46 is illustrated around the first column 19 and is similarly controlled by timer 22. Heat is applied to each column during the desorption step and automatically discontinued at an appropriate time interval prior to commencement of flow of sample to enable each column to cool for the analysis step. The heating coils may be omitted in those instances when a column sorbent material is used which may be readily desorbed by purging only. The above cycle is continuously repeated with respect to each column so that continuous detection of the fluid component of interest may be obtained through one column while the other columns are regenerated. The detector 39 generates a signal corresponding to the concentration of the fluid component of interest which is recorded by a chart recorder 44. The signal may also be utilized by a process controller 45 which issues corrective control commands to the process equipment from which the fluid sample stream is taken.

Referring now to FIG. 2, which is a graphical illustration showing the detected thermal conductivity of the effluent of a chromatograph column plotted against time when the column is subjected to repeated sample increments of the fluid being analyzed, $I_0$ denotes the thermal conductivity response of the carrier gas in the absence of fluid sample flowing through the column. As fluid samples are passed therethrough the effluent thereof will initially contain only the fluid component of interest until the column becomes saturated, then breakthrough of the other fluid components occurs. Since the sample fluid is introduced to the column in the form of distinct increments, the fluid component of interest will be detected as saw-tooth shaped pulses by the thermal conductivity detector. The pulses rise to a height $I_1$ which occurs at the moment of maximum intensity of the fluid component of interest at the effluent of the column, with respect to each sample passed therethrough. It is to be understood that the value of $I-I_0$ at any moment is analagous to the concentration at the column effluent of the fluid component of interest. Therefore, since the total flow rate through the column is maintained constant, the total quantity of the fluid component of interest present in each sample is equal to the area under the curve defining the pulse over the time interval of elution of that sample, and may be expressed as follows:

$$Q = K \int_{t_1}^{t_2} (I - I_0) dt$$

where:

Q = the total quantity of the fluid component of interest present in the elution pulse
I = the detected thermal conductivity response
$t_1$ = the moment in time immediately prior to the occurrence of the elution pulse
$t_2$ = the moment in time immediately subsequent to the occurrence of the elution pulse
K = the calibration constant of the detector, which may be experimentally determined by passing a fluid mixture of known concentration through the column;

$$C_1 = \frac{Q}{S}$$

where:

S = the quantity of any one sample introduced to the column
$C_1$ = the concentration of the fluid component of interest in any one sample, expressed as a decimal.

Also it is seen that the total quantity of fluid sorbed by the column during the flow of any sample therethrough is the difference between the sample quantity and the eluted quantity thus:

$$G = S - Q$$

Where G is the sorbed quantity of the sample.

An important advantage of the pulsed operation described above is that prior to breakthrough a column is useable for a substantially longer period of time than it would be useable if the column is subjected to a continuous flow of the sample stream. This useable time interval is denoted as the interval T in FIG. 2. The sample size and frequency of injection affect this time interval, tending to reduce it as sample size and frequency are increased. When the fluid mixture to be analyzed is a liquid hydrocarbon and a molecular sieve column material is used, a preferred sample size is 5 micro-liters which will enable the column to accurately distinguish between the fluid components. The frequency of the samples depends largely upon the requirements of the process being monitored A five to six minute interval between samples is preferred for applications where reasonably frequent analysis is required.

The time interval T between $t_3$ and $t_4$ indicated in FIG. 2 illustrates the time interval a column is useable before switching to another column and desorption of the former column is required. If the column is operated above the time $t_4$, breakthrough of the sorbed fluid component occurs and the column thereafter passes a mixture of the sorbed components and the fluid component of interest. The detected thermal conductivity response rises to the level $I_2$ which then represents the thermal conductivity response of the mixture which is generally higher than $I_1$ since there is a greater portion of the sample present at the column effluent. Substantially continuous analysis of the fluid component of interest results by switching to another column prior to $t_4$. Switching may also be timed to occur subsequently to $t_4$. In this instance discontinuous analysis results since the detected thermal conductivity response subsequent to $t_4$ is that of the aforementioned mixture.

In addition to being related to the sample size and frequency, and the concentration in the sample of the sorbed fluid component, the interval T is also a function of the capacity of the column to hold the sorbed fluid component. This capacity is in turn a function of the length of the column, and generally may be increased by increasing the length. However, this also has the effect of increasing the residence time of any one sample in the column. When a plurality of columns is used, in accordance with the method of this invention, shortened intervals of T may be tolerated in favor of decreasing the residence time.

It is clear therefore that in order to obtain continuous analysis the number of columns required is related to the sample size and frequency, the minimum time interval required to perform the desorption step, and to the time interval T. The latter, in turn, being related to the capacity of the column, the sorbent material used therein, and the fluid being analyzed. When the column material is a complete adsorbent such as a molecular sieve, and the fluid being analyzed is a hydrocarbon mixture these variables may be thus expressed:

$$T = \frac{H}{FG}$$

and:

$$N = \frac{T_0}{T} + 1 = \frac{FGT_0}{H} + 1 = \frac{FT_0(S-Q)}{H} + 1$$

where:

N = the number of columns required
F = samples injected per unit of time
$T_0$ = time interval required for desorption
Q = average expected quantity per sample, of the fluid component of interest
H = capacity of the column The capacity of the column H above is defined as the total quality of the sorbed fluid component the column is able to hold before breakthrough occurs. When a molecular sieve is used as the column material the value H may be analytically determined in reference to a particular column size from data of the adsorbency of the material, or in hte alternate, it may be experimentally determined. When a general chromatographic sorbent material is used the value H may more expediently be determined experimentally in reference to a particular column configuration since in this instance it may also be a function of the other variables above such as sample size and frequency of sample injection. With information thus obtained and the above mathematical relationships a chromatographic analysis system may be designed in accordance with this invention, wherein continuous analysis of the fluid component of interest may be obtained when N, the number of columns employed, determined in accordance with the above, is raised to the next highest whole number.

Figure 3:
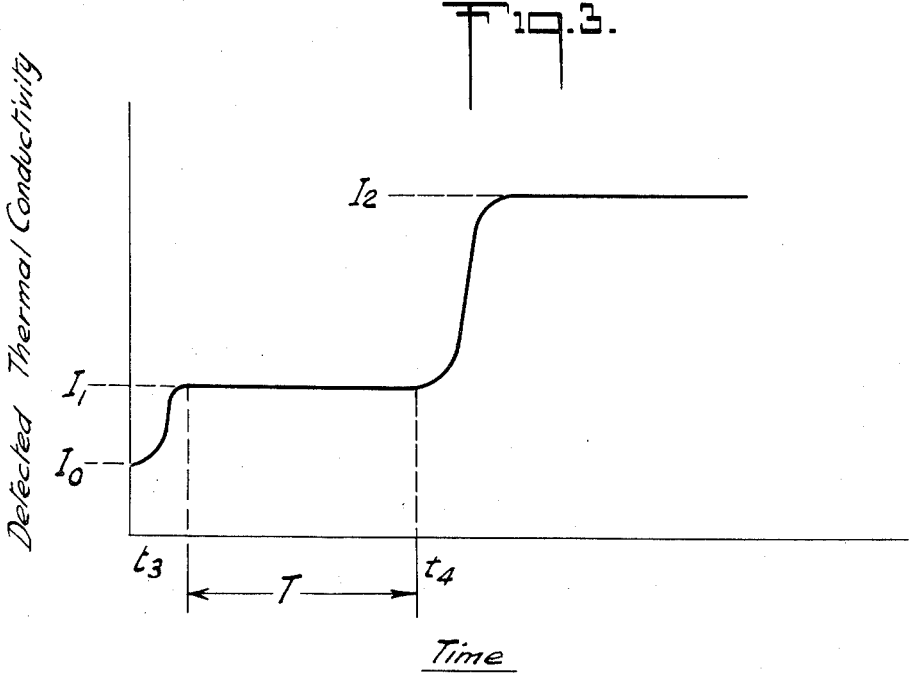
FIG. 3 is a graphical illustration of the detected thermal conductivity response of the effluent of a typical chromatograph column which may be used to practice the invention, plotted against time, when the column is subjected to a continuous flow therethrough of the fluid being analyzed.

Referring now to FIG. 3, which is a graphical illustration of the detected thermal conductivity when the column is subjected to a continuous flow of the fluid being analyzed, $I_0$ denotes the thermal conductivity response of the carrier gas in the absence of fluid sample flowing through the column. As the fluid is passed through the column the thermal conductivity response at its effluent rises to a level $I_1$ which corresponds to the thermal conductivity response of the fluid component of interest, since it is the first component to pass through the column. Since in this instance the sample is introduced at a constant flow rate, $I_1$ will remain constant until breakthrough of the sorbed fluid components. This occurs considerably sooner than it would when the column is subjected to intermittent sample flow since, due to the continuous flow, the column is subjected to a larger quantity of sample per unit of time. The useable time interval T, between $T_3$ and $T_4$ in FIG. 3, is therefore reduced. This effect may be overcome somewhat by using a relatively low flow rate of the sample. Furthermore, by practicing the method of this invention, a plurality of columns may be used, whereby a shortened interval of T may be overcome by increasing the number of columns.

An important advantage of continuous sample flow is that continuous analysis of the sample stream results without interruptions arising from intermittent sample injections.

Since the sample is introduced at a constant flow rate, it can be seen from the foregoing that $I_1$ is proportional to the flow rate of the fluid component of interest at the column effluent and that the concentration of the fluid component of interest in the sample stream is the ratio of $I_1$ to the sample flow rate, thus:

$$C_1 = K \frac{I_1}{S'}$$

where:

$C_1$=the concentration of the fluid component of interest expressed as a decimal
$S'$=flow rate of the sample
$K$=the calibration constant of the detector, which may be experimentally determined by passing a fluid mixture of known concentration through the column.

After breakthrough occurs the detected thermal conductivity response rises to a level $I_2$ which is the thermal conductivity response of a mixture of the fluid component of interest and the sorbed components. This occurs following the point in time $t_4$, shown in FIG. 3. In order to obtain continuous detection of the fluid component of interest, switchover to another column must be timed to occur at $t_4$ or sooner, or in the alternate the system may be operated with some discontinuity by a later switch-over as discussed in reference to FIG. 2.

In addition to being related to the sample flow rate, and the concentration in the sample of the sorbed fluid component, the time interval T of FIG. 3, between $t_3$ and $t_4$, as discussed in reference to FIG. 2, is also a function of the capacity of the column to hold the sorbed fluid component which, in turn, is related to the length of the column, the sorbent material used therein, and the fluid being analyzed. Furthermore, the number of columns required for continuous detection of the fluid component of interest is in turn related to the time interval T, and the minimum time interval required for the desorption step. When the column material is a complete adsorbent such as a molecular sieve, and the fluid being analyzed is a hydrocarbon mixture, the above relationships may thus be expressed:

$$G' = (1 - C_1')S'$$

and:

$$T = \frac{H}{G'}$$

and:

$$N = \frac{T_0}{T} + 1 = \frac{G'T_0}{H} + 1 = \frac{T_0 S'(1 - C_1')}{H}$$

where:

$N$=the number of columns required
$S'$=the flow rate of sample stream introduced into the columns
$C_1'$=the average expected concentration in the sample stream of the fluid component of interest, expressed as a decimal
$G'$=the quantity of the adsorbed fluid components adsorbed per unit of time
$T_0$=the time interval required for desorption
$H$=the capacity of the column which may be analytically or experimentally determined as discussed above in reference to FIG. 2.

With the above mathematical relationships a chromatographic analysis system may be designed in accordance with this invention wherein N, the number of columns employed, determined in accordance with the above, is raised to the next highest whole number.

Referring now to FIG. 4, a sample stream which according to a preferred embodiment of the invention comprises a paraffin mixture of about $C_{10}$ to $C_{15}$ paraffin containing about 0% to 5% non-normal paraffin, is introduced into the system from a source $S_1$ through a conduit 50 which is connected to a flow control valve 51 which periodically measures and releases increments of a predetermined amount of the mixture. A preferred sample increment size is 5 micro-liters injected at a suitable frequency of one sample increment every six minutes. It should be emphasized that the composition of the paraffin mixture being analyzed, the sample size, and the frequency of injection, which have been specified, are merely preferred operating points of the apparatus, and may be varied from the values specified. A conduit 52 is connected to the outlet of sample control valve 51 and carries the fluid samples from the flow control valve 51 to a vaporizer 53. Helium is introduced from a source $S_2$ through a conduit 54 to an inlet 55 of the vaporizer 53. The successive fluid samples are vaporized in the vaporizer 53 in the presence of the helium carrier gas and mixed therewith. The gaseous mixture flows from the outlet of the vaporizer 53 through a conduit 56 to an inlet port 57 of a solenoid operated control valve 58, which is an electrically operated four path fluid diverter valve, having two operative positions and having a first and second inlet ports 57 and 59 respectively, and a first and second outlet ports 60 and 61 respectively. In operation, the operative position of the valve 58 is controlled by a timer 62. The second inlet port 59 of the valve 58 is connected to the helium source $S_2$ through the conduit 54. The first and second outlet ports of the valve 58 are connected to a first and second chromatograph columns 63 and 64 respectively, through conduits 65 and 66 respectively. When valve 58 is in a first operative position its first inlet port 57 is in fluid communication with its first outlet port 60 and its second inlet port 59 is in fluid communication with its second outlet port 61 thereby permitting flow of the paraffin samples being analyzed to the first chromatograph column 63 and concurrently permitting flow of the helium purge gas to the second chromatograph column 64. When the valve 58 is in its second operative position its first inlet port 57 is in fluid communication with its second outlet port 61 and its second inlet port 59 is in fluid communication with its first outlet port 60, thereby permitting flow of the paraffin samples being analyzed to the second chromatograph column 64 and concurrently permitting flow of the helium purge gas to the first chromatograph column 63. Columns 63 and 64 are constructed of ¼" diameter stainless steel tubing having a bore size of approximately .200 inch and are 12 inches in length. They are packed with a zeolite molecular sieve material of particle size 35 to 60 mesh, in the form of a calcium exchanged sodium alumino silicate (70% CaO to $Al_2O_3$ ratio), having pores of about 5 angstrom units in diameter, market by the Linde Division of the Union Carbide Corporation under the trade designation; Type 5A–45 molecular sieve. While the above particle size is preferred, 60 to 80 mesh size may also be used. This material adsorbs the normal paraffin component of the samples and permits the non-normal paraffin component to pass through the columns and elute therefrom.

The helium source $S_2$ is pressure regulated within a range of 20 to 80 p.s.i.g. to provide adequate flow of the gaseous sample mixture and of the purge gas through the columns to overcome the flow resistance of the column packing material. This pressure maybe appropriately altered if the length or diameter of the columns or the mesh size of the sorbent are altered. The foregoing configuration of the columns results in a residence time of about 5 minutes from the time of injection of any one sample until elution of the non-normal paraffin component of the sample.

The molecular sieve material is coated with a one percent solution of silicone gum rubber marketed by the General Electric Corporation under the trade designation; Type SE–30 silicone rubber, to prevent "tailing effects" during elution. This phenomena is characterized by the tendency of a fraction of the non-normal paraffin component of the samples to be adsorbed on the surface of the molecular sieve particles. This results in a prolonged elution of the samples and reduces the accuracy of the system. It was found that this effect may be prevented by use of the above material which formed a surface barrier over the molecular sieve particles without reducing the ability to adsorb the normal paraffin component in the pores thereof.

The outlet ends of columns 63 and 64 are connected to conduits 67 and 68 respectively, which in turn are connected to a first and second inlet ports 69 and 70 respectively, of a solenoid operated control valve 71 which is similar in construction to the valve 58, and is similarly operated by the timer 62. Additionally, valve 71 has first and second outlet ports 72 and 73. The first outlet port 72 is connected to a thermal conductivity detector 74 which detects the normal paraffin content of the effluent of the chromatograph columns by comparing its thermal conductivity response with the thermal conductivity response of the helium carrier gas. The gas is introduced to the detector 74 through a conduit 75 which is connected to the conduit 54 which is in turn connected to the helium source $S_2$. The second outlet port 73 of the valve 71 is connected to a vent conduit 76 for venting of the purge gas passed through the columns. When the valve 71 is in its first operative position its first inlet port 69 is in fluid communication with its first outlet port 72, and its second inlet port 70 is in fluid coccunication with its second outlet port 73, thereby permitting flow of the effluent of the first column 63 to the detector 74 and concurrently permitting venting of the effluent of the second column 64.

When the valve 71 is in a second operative position its second inlet port 70 is in fluid communication with its first outlet port 72 and its first inlet port 69 is in fluid communication with its second outlet port 73, thereby permitting flow of the effluent of the second column 64 to the detector 74 and concurrently permitting venting of the effluent of the second column 64.

The timer 62 is pre-programmed to control the switching sequence of valves 58 and 71 so that when the valve 58 is in its first operative position valve 71 is also in its first operative position thereby permitting flow of the paraffin samples to the first column 63 and of the effluent thereof to the detector 74 and concurrently permitting flow of the helium purge gas through the second column 64 and through the valve 71 to the purge gas vent 76. After a time interval of about three hours which corresponds to the injection of 30 samples of the paraffin mixture spaced at six minutes between samples, the timer switches the valves 58 and 71 to their second operative positions thereby switching the sample flow to the second column 64 and the flow of effluent thereof to the detector 74 and causing a switching of the flow of purge gas to the first column. The switch over of valves 58 and 71 need not be concurrent, and may be somewhat time displaced as discussed in reference to FIG. 2. It is preferred that the valve 58, controlling the inlet flow to the columns, is switched to its second operative position approximately five minutes in advance of valve 71 so that the last sample injected into the first column 63 will pass to the detector 74 before switch-over of the valve 71.

After switch-over of the inlet control valve 58 is completed, as discussed above, the flow of the paraffin samples to the second column is continued for three hours, and during this time period the first column is subjected to a flow of the helium purge gas for desorption of the adsorbed normal paraffin component of the sample stream. At the end of this time, desorption of the first column 63 is complete and the inlet control valve 58 is switched back to its first operative position and about 5 minutes later the outlet control valve 71 is also switched back to its first operative position. This operating sequence is continuously repeated thereby obtaining substantially continuous detection of the non-normal paraffin content of the sample stream uninterrupted for desorption steps.

The timer 62 also controls the flow of electrical current to heating elements 77 and 78. These elements comprise about 15 feet of 22 gauge nichrome heating wire manufactured by the Philadelphia Insulated Wire Co., Inc., under the trade designation "Tophet C" wire, having 6 braid high temperature glass fiber insulation and having a resistance of about 15 ohms, wound around each of the columns 63 and 64. The heating elements are operated by the timer 62 which applies suitable electrical power, 115 volts, 60 c.p.s. being preferred, to each element during the first hour of the aforementioned 3 hour time period of helium purge gas flow through each column. The columns 63 and 64 with their associated heating elements are mounted within thermally insulated enclosures 79 and 80 respectively, so that a temperature of the columns of about 290° C. to 320° C. is sustained for a major portion of the 1 hour time period of flow of electrical current through each of the heating elements.

It has been found that the time period required for desorption is a function of the column material, the fluid being analyzed, the ambient pressure, the temperature, and the flow rate of the purge gas. Generally this time period is reduced by increasing the temperature or the flow rate of the purge gas. When the aforementioned column material was used to analyze the paraffin mixture indicated it was found that desorption could be accomplished and column equilibrium established within 3 hours thereby requiring the use of only two columns, when the columns are heated as indicated above during the desorption step, and the flow of the helium purge gas is in the range of 30 to 60 cubic centimeters per minute and the purge pressure was in the range 20 to 80 p.s.i.g. Either one of the aforementioned variables may be altered provided that corresponding adjustments are made in the other variables or in the alternate an additional column may be utilized. Indeed, in the present embodiment of the two columns broad variations of the desorption temperature may be tolerated with appropriate adjustments of the purge gas flow rate. Desorption temperatures in the range of 290° C. to 350° C. will result in satisfactory desorption when purge gas flow rates in the range of 30 to 60 cubic centimeters are used. It should be noted that these variables also depend upon the column material used.

It was also found that adsorption of the normal paraffin components and separation of the non-normal paraffin components was most accurately accomplished when the temperature of the columns was controlled and maintained relatively constant at an elevated temperature during the adsorption step. Temperatures in the range of 150° C. to 190° C. were found satisfactory while temperatures in the range of 165° C. to 185° C. obtained best results. Therefore, the enclosures 79 and 80 with the chromatograph columns mounted therein are in turn mounted in an oven 81 which is maintained at a temperature of about 165° C. to 185° C. The temperature of each column is therefore maintained at this ambient temperature of the oven 81 during the adsorption steps, then climbs to about 300° C. to 320° C. during the first hour of each desorption step, and then gradually cools down to the oven ambient temperature during the remaining two hours of each desorptoin step.

The sample control valve 51, the vaporizer 53, the inlet control valve 58, the outlet control valve 71, and the detector 74 are all mounted in a second oven 82, also controlled at a temperature of 165° C. to 185° C. This insures a uniform temperature of the paraffin sample stream flow to the columns and a uniform temperature of the detector, resulting in maximum accuracy of the system.

While greater accuracy results by the use of the oven 81, it should be noted that its use is not mandatory and a workable result would be obtained by its omission and by mounting the enclosures 79 and 80, containing the chromatograph columns, adjacent to the oven 82. With reference to these enclosures it is merely required that they be thermally isolated from the detector 74 and the valves 71 and 58, to prevent heating of the detector and the valves during the desorption periods of the columns, since the accuracy of the system is most affected by the temperature of these components.

The aforementioned operating and desorption temperatures are preferred for the analysis of $C_{10}$ to $C_{15}$ paraffin samples. Heavier range paraffins would require a somewhat higher temperature and lighter range paraffins would require a lower temperature. These temperatures may be determined experimentally by the analysis of samples of known composition.

The detector 74 generates a signal corresponding to the detected thermal conductivity response at the effluent of the columns, and electronically integrates this signal to obtain a signal proportional to the non-normal paraffin content of the sample stream which is in turn recorded by a chart recorder 83. In the alternate, the detected thermal conductivity signal may be first recorded and the required integration may be performed by use of a planimeter. The integrated signal in addition to being observable on the recording chart may be utilized by a process controller as indicated in reference to FIG. 1.

Generally, as discussed in reference to FIGS. 2 and 3, the methods of this invention and the apparatus of FIGS. 1 and 4 may be used for the analysis of any fluids which are subject to chromatographic analysis, by making proper adjustments to the operating variables such as the desorption temperature, the operating temperature, the timing sequence and the column material. The following are further examples of column sorbent materials which may be used in practicing the invention:

(a) the use of a Linde type 13X zeolite molecular sieve to analyze for gaseous impurities in a gaseous mixture consisting primarily of carbon dioxide;

(b) the use of sulfuric acid on silica gel to remove aromatics from stream of saturated hydrocarbons;

(c) the use of boric acid on a suitable support such as crushed fire-brick for the analysis of alcohols.

While the invention has been described with a certain degree of particularity, it can, nevertheless, be seen by the examples hereinabove set forth that many modifications and variations of the invention may be made without departing from the spirit and scope thereof.

We claim:

1. An apparatus for substantially continuously detecting a selected component of a fluid mixture from a source thereof consisting of at least a first fluid component for detection and at least another fluid component, comprising:

(a) at least two parallel flow path chromatograph columns each having an inlet and an outlet, means including sorbent material in said columns for sorbing said other fluid component while permitting earlier passage through said columns of said first fluid component for detection;

(b) flow control means for periodically measuring and releasing a sample of predetermined quantity of said fluid mixture from said source and for selectively directing and interrupting a flow of said periodic samples to said inlets of said columns, said flow control means including a remotely controlled multi-path fluid diverter valve having a plurality of output paths, one of which is connected to the respective inlet of each of said columns;

(c) a source of carrier agent operatively coupled with said inlets of said columns for carrying the flow of said samples therethrough;

(d) detection means operatively coupled to said outlets of said columns for measuring a property of the effluent thereof for detecting said first fluid component;

(e) regeneration means for periodically desorbing said other fluid component from said adsorbent in said columns, said regeneration means comprising a source of purge gas and remotely controllable means for selectively heating each of said columns and means including said valve means for passing said purge gas through said columns while said heating means subjects said columns to a temperature sufficient to accelerate said desorbing;

(f) means including a time cycle controller coupled to said remotely controllable valve means and to said heating means for controlling said flow control means and said regeneration means in a cyclical manner to provide repeated cycles of operation wherein said periodically measured samples of said fluid mixture are passed through said valve to a first of said columns for a time interval of flow while said purge gas is passed through said valve to another of said columns while said heating means is operated to heat said other column so that it is regenerated, said time interval of flow with respect to each of said columns being sufficient to permit a plurality of said samples to pass therethrough and terminating prior to substantial breakthrough of said other fluid component to the effluent thereof, thereby providing continuous detection of said first fluid component by providing detection thereof through at least one column while another of said columns is being regenerated.

2. An apparatus for substantially continuously detecting a minor component of non-normal paraffins in a fluid mixture from a source thereof, said fluid mixture being comprised of a minor component of non-normal paraffins for detection and a major component of normal paraffins comprising:

(a) at least two parallel flow path chromatograph columns each having an inlet and an outlet, means including sorbent material in said columns for sorbing said normal paraffin component while permitting earlier passage through said columns of said non-normal paraffin component for detection;

(b) flow control means for periodically measuring and releasing a sample of predetermined quantity of said fluid mixture from said source and for selectively directing and interrupting a flow of said periodic samples to said inlets of said columns, said flow control means including a remotely controlled multi-path fluid diverter valve having a plurality of ouput paths, one of which is connected to the respective inlet of each of said columns;

(c) a source of an inert carrier gas operatively coupled with said inlets of said columns for carrying the flow of said samples therethrough;

(d) detection means operatively coupled to said outlets of said columns for measuring a property of the effluent thereof for detecting said non-normal paraffin component;

(e) regeneration means for periodically desorbing said normal paraffin component from said adsorbent in said columns, said regeneration means comprising a source of purge gas and remotely controllable means for selectively heating each of said columns and means including said valve means for passing said purge gas through said columns while said heating means subjects said columns to a temperature sufficient to accelerate said desorbing;

(f) means including a time cycle controller coupled to said remotely controllable valve means and to said heating means for controlling said flow control means and said regeneration means in a cyclical manner to provide repeated cycles of operation wherein said periodically measured samples of said fluid mixture are passed through said valve to a first of said columns for a time interval of flow while said purge gas is passed through said valve to another of said columns while said heating means is operated to heat said other column so that it is regenerated, said time interval of flow with respect to each of said columns being sufficient to permit a plurality of said samples to pass therethrough and terminating prior to substantial breakthrough of said normal paraffin component to the effluent thereof, thereby providing continuous detection of said non-normal paraffin component by providing detection thereof through at least one column while another of said columns is regenerated.

3. The apparatus of claim 2 wherein said sorbent material in said columns comprises an absorbent zeolite of the form of calcium exchanged sodium alumino silicate, and wherein said regeneration means (e) includes means for heating said columns to a temperature in the range of about 290° C. to 350° C. while passing an inert purge gas therethrough.

4. The apparatus of claim 3 wherein said controlled heating means are provided for controlling the temperature of said first flow control means, and said carrier gas introduced into said columns, to a temperature in the range of about 150° C. to 190° C., said controlled heating means further comprising means for controlling the temperature to a range of about 150° C. to 190° C. of each of said respective columns during its respective time interval of flow of said periodic samples thereto.

5. An apparatus for substantially continuously detecting a minor component of non-normal paraffins in a fluid mixture from a source thereof, said fluid mixture being comprised of a minor component of non-normal paraffins for detection and a major component of normal paraffins comprising:

(a) at least two parallel flow path chromatograph columns each having an inlet port and an outlet port, means in said columns including an adsorbent material comprised of an adsorbent zeolite of the form of calcium exchanged sodium alumino silicate for sorbing said normal paraffin component while permitting passage therethrough of said non-normal paraffin component for detection;

(b) flow control means for periodically measuring and releasing a sample of predetermined quantity of said fluid mixture from said source and for directing and interrupting a flow of said periodic samples to said inlets of said columns, said flow control means including a remotely controlled multi-path fluid diverter valve having a plurality of output paths respective ones of which are connected to the respective inlet ports of each of said columns, said valve means being further adapted to direct a flow of a carrier gas to each of said columns while directing said samples to said columns and adapted to alternately direct a flow of a purge gas into said columns;

(c) a source of an inert carrier gas coupled to said first flow control means for directing said gas to said inlet ports of columns and carrying the flow of said samples through each of said respective columns;

(d) detection means operatively coupled to said outlets of said columns for measuring a property of the effluent thereof for detecting said non-normal paraffin component;

(e) a first thermal enclosure wherein are mounted said chromatograph columns, said first enclosures including controlled heating means for controlling the temperature therein to about 150° C. to 190° C.;

(f) a second thermal enclosure wherein are mounted said first flow control means and said detection means, said second enclosure including controlled heating means for controlling the temparature therein to about 150° C. to 190° C. thereby providing said controlled temperature of the inlet sample flow of said columns and of the effluent thereof for detection;

(g) remotely controllable heating means operatively coupled to each of said columns for alternately heating each of said columns to a temperature in the range of about 290° C. to 350° C. for regenerating said columns by desorbing said normal paraffin component of said samples adsorbed, and (h) means including a time cycle controller coupled to said remotely controllable valve means and to said heating means for controlling said flow control means and said heating means in a cyclical manner to provide repeated cycles of operation wherein said periodically measured samples and said carrier gas are passed through said valve to a first of said columns for a predetermined time interval of flow while purge gas is passed through said valve means to another of said columns while said heating means (g) is operated to subject said other column to heat and subjected to a flow of said purge gas for regeneration thereof by desorbtion, said time interval of sample flow with respect to each of said columns being sufficient to permit a plurality of said samples to pass therethrough and terminating prior to substantial breakthrough of said fluid component to the effluent thereof, thereby providing continuous detection of said non-normal paraffin component by providing detection thereof through at least one column while another of said columns is regenerated.

References Cited
UNITED STATES PATENTS

| | | | |
|---|---|---|---|
| Re. 24,876 | 9/1960 | Coggeshall | 73—23.1 |
| 2,757,541 | 8/1956 | Watson | 73—23.1X |
| 2,833,151 | 5/1958 | Harvey | 73—23.1X |
| 2,972,246 | 2/1961 | Reinecke | 73—23.1 |
| 2,981,092 | 4/1961 | Marks | 73—23.1 |
| 3,049,909 | 8/1962 | Thomas | 73—23 |
| 3,069,897 | 12/1962 | Sanford | 73—23.1 |
| 3,121,321 | 2/1964 | Karasek | 73—23.1 |
| 3,134,257 | 5/1964 | Reinecke | 73—27 |
| 3,248,929 | 5/1966 | Webb | 73—23.1 |

RICHARD C. QUEISSER, Primary Examiner

C. E. SNEE III, Assistant Examiner

U.S. Cl. X.R.

55—197